3,152,038
FUNGICIDAL AGENTS
Ewald Urbschat, Cologne-Muhlheim, and Ferdinand Grewe, Cologne-Stammheim, Germany, assignors to Farbenfabriken Bayer Aktiengesellschaft, Leverkusen, Germany, a corporation of Germany
No Drawing. Filed Apr. 9, 1963, Ser. No. 271,566
Claims priority, application Germany Apr. 17, 1962
10 Claims. (Cl. 167—30)

The present invention relates to known diaryl azo compounds which have a remarkable high fungicidal activity.

It has been found that the diaryl azo compounds of the formula

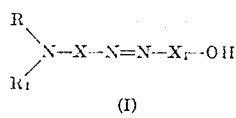

(I)

in which
R and $R_1$ stand for alkyl, aralkyl and aryl,
R and $R_1$ taken together with the nitrogen atom stand for heterocyclic radicals,
R further stands for hydrogen and
X and $X_1$ stand for arylene which may be substituted by halogen, nitro, alkyl, aryl, alkoxy, hydroxy, carboxy and/or carbalkoxy
exhibit a high fungicidal activity.

The diaryl azo compounds of the invention are especially suitable for combating obnoxious fungi on green plant parts. On the other hand, the products show only a slight toxicity to warm blooded creatures as well as a slight phytotoxicity.

In the above mentioned Formula I R and $R_1$ preferably stand for alkyl with 1–4 carbon atoms and phenyl. R and $R_1$ taken together with the nitrogen atom preferably stand for heterocyclic radicals with 5–6 ring members such as pyrolidyl and morpholinyl. R further stands for hydrogen. X and $X_1$ preferably stand for phenylene which may be substituted by chlorine, bromine, the nitrogen group, alkyl radicals with 1–4 carbon atoms, phenyl, alkoxy radicals with 1–4 carbon atoms, the hydroxy group and/or the carboxy group.

In comparison with the coupling products of basic-substituted aromatic diazonium salts with compounds containing reactive methylene groups, known from the Belgian patent specification No. 594,503 and proposed for the same purpose, the agents according to the present invention exhibit a likewise substantially smaller toxicity to warm blooded creatures and a better tolerance by plants. The azo compounds, also known as fungicidally effective, in which R and $R_1$ (see the above mentioned formula) stand for hydrogen atoms, are much surpassed by the preparations to be employed according to the present invention in application against leaf fungi, as is apparent from the following table:

Table I
ACTIVITY AGAINST *PHYTOPHTHORA INFESTANS* ON TOMATOES

| Preparation No. | Constitution | Degree of infestation after application of the preparation in an active agent concentration of— | | |
|---|---|---|---|---|
| | | 0.025 percent | 0.00625 percent | 0.003125 percent |
| 1 | $H_2N$—⟨ ⟩—N=N—⟨ ⟩—OH | 100 | 100 | 100 |
| 2 | $(CH_3)_2N$—⟨ ⟩—N=N—⟨ ⟩—OH | 6 | 12 | 30 |
| 3 | $H_2N$—⟨ ⟩—N=N—⟨ ⟩($CH_3$)—OH | 100 | 100 | 100 |
| 4 | $(CH_3)_2N$—⟨ ⟩—N=N—⟨ ⟩($CH_3$)—OH | 5 | 26 | 36 |
| 5 | $H_2N$—⟨ ⟩—N=N—⟨ ⟩($CH_3$, $CH_3$)—OH | 100 | 100 | 100 |
| 6 | $(CH_3)_2N$—⟨ ⟩—N=N—⟨ ⟩($CH_3$, $CH_3$)—OH | 0 | 2 | 13 |

From the given results of control experiments it is evident that the known substances 1, 3 and 5 possess no fungicidal action whatsoever against Phytophthora, whereas the Phytophthora infestation is very strongly reduced by the products 2, 4 and 6 to be employed according to the invention.

The production of the compounds takes place according to methods known as such as is illustrated by way of the following representative example:

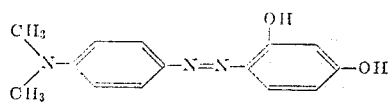

136 g. (1 mol) of 4-aminodimethyl aniline are diazotised at 0 to 5° C. in a mixture of 1000 cc. of water and 225 g. of concentrated hydrochloric acid with 70 g. of sodium nitrite, dissolved in 250 ccm. water. The diazonium salt solution is then allowed to flow into a solution of 120 g. of resorcinol in 1200 cc. of water. After completion of the addition, the mixture is treated while stirring vigorously with solid sodium bicarbonate until it gives an alkaline reaction, the dark precipitate formed is further stirred for several hours, filtered off with suction after 20 hours standing of the mixture, thoroughly washed with water and dried at 50 to 60° C. The 4-N,N-dimethylamino-2',4'-dihydroxy-azobenzene is obtained in almost quantitative yield, decomposes on heating at about 200° C.

In a similar manner the following compounds to be used as fungicides according to the invention can be obtained:

4-N,N-dimethylamino-4'-hydroxyazobenzene
4-N,N-dimethylamino-3'-methyl-4'-hydroxyazobenzene
4 - N,N-dimethylamino-3',5'-dimethyl-4'-hydroxyazobenzene
4-N,N-dimethylamino-3'-phenyl-4'-hydroxy-azobenzene
4-N,N-dimethylamino-3'-chloro-4'-hydroxy-azobenzene extended as sprays or dusts. Other fungicides, insecticides, acaricides, wetting and adhesive agents or other substances favourably influencing the action of the preparations, can be added.

The following examples illustrate the invention in more detail.

EXAMPLE 1

Test of the fungicidal activity in application against *Phytophthora infestans* on tomatoes.

Young tomato plants (Bonny Best) are sprayed with aqueous suspensions or emulsions of the preparations mentioned below. When the sprayed coatings have dried, the plants are inoculated in a moist chamber with an aqueous slurry of fungus spores and these are then incubated at 18 to 20° C. and 100% relative atmospheric humidity for 5 days. Evaluation follows of the degree of infestation by determination of the intensity of infestation on each feather-leaf. From the infestation frequency and infestation intensity, the degree of infestation is calculated and expressed in percent of the infestion of untreated controls, whose degree of infestation is taken as 100.

The values found are assembled in the following Table II.

*Table II*

| Preparation | Physical Properties | Melting Point, ° C. | Fungicidal action against *Phytophthora infestans* on tomatoes; degree of infestation after application of the preparation in active agent concentration of— | | |
|---|---|---|---|---|---|
| | | | 0.025 percent | 0.00625 percent | 0.00315 percent |
| (CH$_3$)$_2$N—⟨ ⟩—N=N—⟨ ⟩—OH | Brown crystals from xylene | 191–191 (decomp.) | 6 | 12 | 30 |
| (CH$_3$)$_2$—N—⟨ ⟩—N=N—⟨ ⟩(CH$_3$)—OH | Red crystals from benzene | 167–168 (decomp.) | 5 | 26 | 36 |
| (CH$_3$)$_2$—N—⟨ ⟩—N=N—⟨ ⟩(CH$_3$, CH$_3$)—OH | Brown crystals from ethanol | 149 | 0 | 2 | 13 |
| (CH$_3$)$_2$—N—⟨ ⟩—N=N—⟨ ⟩(C$_6$H$_5$)—OH | Red crystals from benzene | 138 (decomp.) | 4 | | |
| (CH$_3$)$_2$—N—⟨ ⟩—N=N—⟨ ⟩(HO)—OH | Brown crystals from ethanol | 203 (decomp.) | 0 | 4 | 17 |
| (CH$_3$)$_2$—N—⟨ ⟩—N=N—⟨ ⟩(Cl)—OH | Brown crystals from toluene | 152–153 | 3 | 6 | 27 |
| Comparison agent (Zinc ethylene-bis-dithio carbamate) | | | | 39 | 66 |
| Control (untreated) | | | 100 | | |

4-N,N-diethylamino-2'-4'-dihydroxyazobenzene
4-N-methylamino-3-methyl-2',4'-dihydroxyazobenzene
4-N,N-dimethylamino-3'-carboxy-4'-hydroxyazobenzene
4-pyrrolidyl-2',4'-dihydroxyazobenzene
4-morpholyl-3',5'-dimethyl-4'-hydroxyazobenzene The compounds to be used according to the invention are either applied as such or preferably in the usual way

We claim:
1. Method for controlling fungi which comprises applying to said fungi an effective amount of a diaryl azo compound of the formula

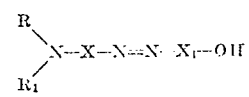

in which

R is a member selected from the group consisting of hydrogen, alkyl with 1–4 carbon atoms and phenyl;

$R_1$ is a member selected from the group consisting of alkyl with 1–4 carbon atoms and phenyl;

R and $R_1$, when defined as alkyl and, taken together with nitrogen further stand for a 5–6 membered heterocyclic group; and, X and $X_1$ stand for a member selected from the group consisting of phenylene and substitution products thereof containing at least one member selected from the group consisting of chloro, bromo, nitro, alkyl with 1–4 carbon atoms, phenyl, alkoxy with 1–4 carbon atoms, hydroxy and carboxy.

2. Method for controlling fungi which comprises applying to said fungi an effective amount of 4-N,N-dimethylamino-3'-methyl-4'-hydroxyazobenzene.

3. method for controlling fungi which comprises applying to said fungi an effective amount of 4-N,N-dimethylamino-3'-methyl-4'-hydroxyazobenzene.

4. Method for controlling fungi which comprises applying to said fungi an effective amount of 4-N,N-dimethylamino-3',5'-dimethyl-4'-hydroxyazobenzene.

5. Method for controlling fungi which comprises applying to said fungi an effective amount of 4-N,N-dimethylamino-3'-phenyl-4'-hydroxyazobenzene.

6. Method for controlling fungi which comprises applying to said fungi an effective amount of 4-N,N-dimethylamino-2',4'-dihydroxyazobenzene.

7. Method for controlling fungi which comprises applying to said fungi an effective amount of 4-N,N-dimethylamino 3'-chloro-4'-hydroxyazobenzene.

8. Method for controlling fungi which comprises applying to said fungi an effective amount of 4-N,N-dimethylamino-4'-hydroxy azobenzene.

9. Method for controlling fungi which comprises applying to fungi an effective amount of 4-pyrrolidyl-2',4'-dihydroxy-azobenzene.

10. Method for controlling fungi which comprises applying to said fungi an effective amount of 4-morpholyl-2',4'-dimethyl-4'-hydroxy azobenzene.

References Cited in the file of this patent

UNITED STATES PATENTS

| | | |
|---|---|---|
| 1,680,108 | Ostromislensky | Aug. 7, 1928 |
| 2,010,512 | Ebert | Aug. 6, 1935 |
| 2,085,037 | Mietzsch et al. | June 29, 1937 |
| 2,148,705 | Mietzsch et al. | Feb. 28, 1939 |
| 2,911,336 | Urbschat et al. | Nov. 3, 1959 |